Nov. 22, 1966 T. H. FLOWERS 3,287,700

CORE MATRIX HAVING INPUT AND OUTPUT LINES CONNECTED IN A PRIORITY ARRANGEMENT

Filed May 16, 1963

THOMAS H. FLOWERS,
INVENTOR

BY Hall & Houghton

ATTORNEY

United States Patent Office 3,287,700

Patented Nov. 22, 1966

3,287,700

CORE MATRIX HAVING INPUT AND OUTPUT LINES CONNECTED IN A PRIORITY ARRANGEMENT

Thomas Harold Flowers, London, England, assignor to Her Majesty's Postmaster General, London, England Filed May 16, 1963, Ser. No. 280,812

Claims priority, application Great Britain, May 23, 1962, 19,890/62

2 Claims. (Cl. 340—166)

This invention relates to selecting circuits using cores of rectangular hysteresis loop magnetic material in which the circuit is arranged to have an element of preference in selecting one of several inputs applied to it. Thus, a particular input, of present, is always selected in preference to any other input which may be present simultaneously. Further, if the first input is not present, another input is given preference over any other inputs present simultaneously. The remaining inputs have an order of precedence indicating the order in which they are selected if present simultaneously.

Such selecting circuits are described in British patent specification No. 890,953 which discloses a selecting circuit having a chain of magnetic cores, the position in the chain of a core indicating the priority of selection or order of precedence given to an input applied to the particular core. An input to a particular core disables all cores of lower priority selection and switches the magnetic condition of the core unless inputs are also present on cores of higher priority selection. Thus, if inputs are also present, on cores of lower priority selection, no response by these cores to the inputs is possible.

In such a circuit, the order of priority is determined by the manner in which the cores are interconnected and the order can be changed only by changing the electrical wiring of the circuit. Changes in the order of priority are sometimes needed or it may be required to introduce a degree of randomness into the selection. The first of those requirements can be met in the known circuit only by wiring changes and the second cannot be met at all.

According to the present invention the problem is overcome by providing the selecting circuit with a plurality of rows of cores each row containing the same number of cores and each row having the cores arranged with a different order of priority or precedence for selection purposes. Inputs from which a selection is to be made are applied to input leads each of which is joined to an input winding on one core in each row but a response is obtained from one core in only one row because biassing circuits are provided for selectively disabling the cores in all rows except one.

Each row of cores may have a common biassing circuit including a source of time spaced pulses which periodically disable the bias sources and so render the cores of the row operational to make a selection of applied inputs.

By way of example only, an embodiment of the invention will now be described in greater detail with reference to the accompanying drawings of which:

Figure 1:
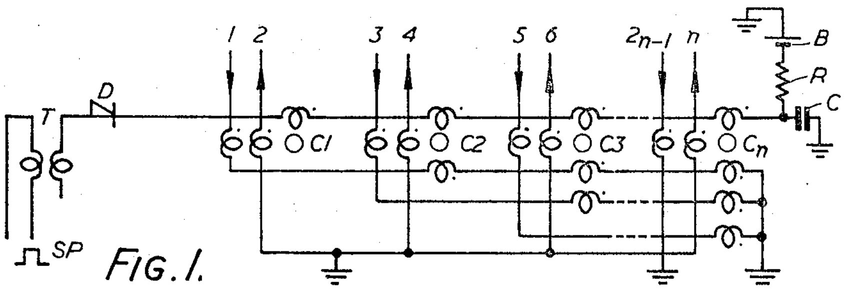
FIG. 1 is a circuit diagram in schematic form of part of the embodiment.

FIG. 1 shows a single row of cores C1 . . . C*n* of rectangular hysteresis loop magnetic material with, for each core, an input lead 1, 3, 5 . . . 2*n*—1 and an output lead 2, 4, 6 . . . 2*n* each lead of which is connected to an input winding and an output winding respectively on the associated core. In addition, each input lead is connected to a further bias winding on each succeeding core in the row. Thus, input lead 1 is joined to an input winding on core C1 and other windings on each of the cores C2, C3 . . . C*n*. Input lead 3 is joined to an input winding on core C2 and further windings on cores C3 . . . C*n*. For the sake of convenience the windings are drawn outside the cores.

Each core has also a bias winding joined via resistor R to a source B of bias potential. The junction of resistor R and the bias windings is earthed via capacitor C. In series connection with the bias windings of the cores is a diode D and the secondary of a transformer T whose primary is joined to a source of input pulses SP. Bias current flows via the transformer secondary winding, the bias windings of the cores and the resistor R to battery B except when the primary of the transformer is pulsed with an SP pulse when the diode is biased in the direction of low conduction and the current from the battery is momentarily diverted via capacitor C to earth.

The direction of the windings is indicated by the spot convention in which current into a winding at the end indicated by a spot tends to set the core to the arbitrary 1 condition while current out of a winding at the end indicated by a spot tends to set the core to the arbitrary 0 condition. Thus, current flow through the bias winding tends to set the cores to the 0 condition whilst current flow in an input lead of a core tends to set that core to the 1 condition and the remaining cores to which the input lead is connected to the 0 condition because of the further bias winding mentioned above. Any core driven to the 1 condition produces an output in its output winding and so on the output lead connected to that winding.

Bias current is arranged always to exceed input current and when one or more inputs occur during removal of the current in the bias windings by the SP pulse only one core can be driven to the 1 condition because of the effect of the further bias windings connected to the input leads. The magneto-motive force of one of the further windings is sufficient to prevent its core being driven to the 1 condition if an input is present on the core's input lead. It will be seen that the further bias windings are arranged so that the first core C1 has none, the second core C2 has one which is joined to the input lead of core 1, the third core C3 has two, one being joined to input lead 1 and the other to input lead 3, and so on. Thus, an input on lead 1 takes precedence over any other input simultaneously present on other input leads. Similarly, an input on lead 3 takes precedence, in the absence of an input on lead 1, over other simultaneously present inputs and so on.

The number of cores can be increased to a maximum determined by the number of windings it is possible to put on any one core.

Where it is not possible to have a sufficiently large number of cores to make a single stage selection in the manner described above, selection in stages may be used. The additional stages may comprise selecting circuits of the form described above or other forms of selecting apparatus may be used to select several inputs from a large number of inputs and those selected inputs are then applied if necessary to a second selecting stage and eventually to a selecting circuit embodying the present invention.

The operation of the selector starts with all cores in the arbitrary 0 condition. Inputs from which a selection is to be made are applied to the appropriate input leads and the selection is made as described above, the selected input being indicated by an output on the output lead of the core which has been driven to the 1 condition by the selected input. The embodiment described with reference to FIG. 2 is particularly suitable for use in selecting one of a number of inputs presented as pulses appearing at recurring time intervals in a recurring cycle of time positions.

Figure 2:
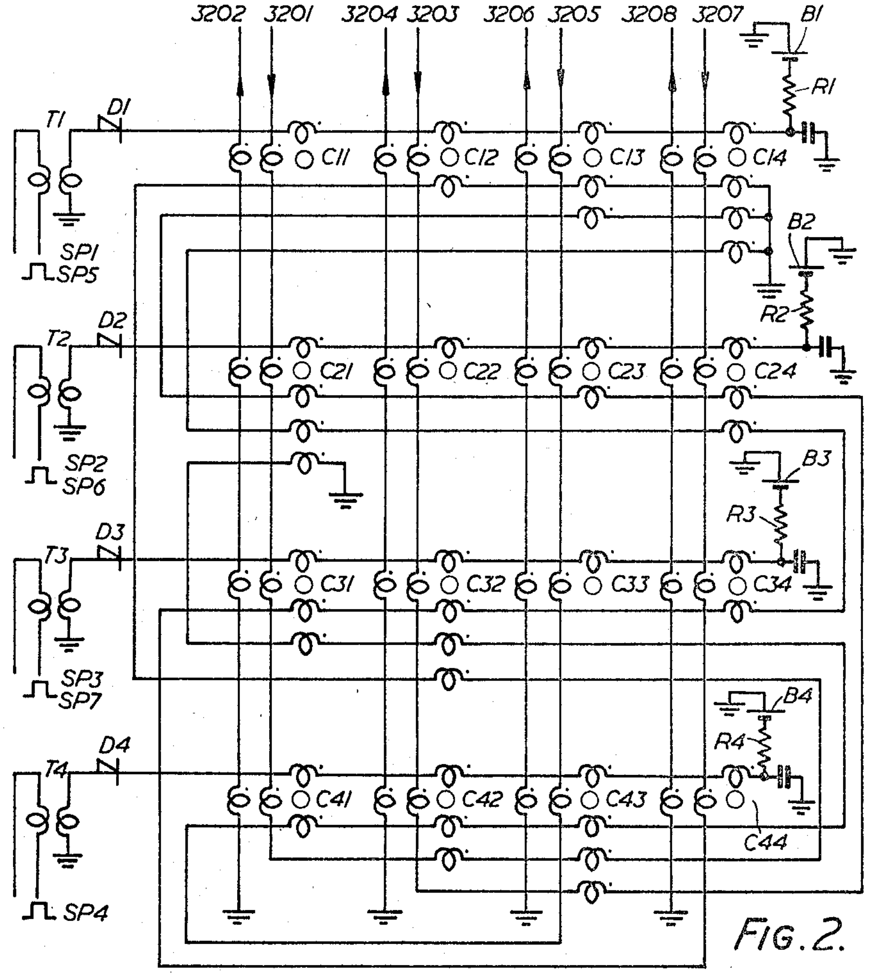
FIG. 2 is a circuit diagram in schematic form of the embodiment.

FIG. 2 shows a selector designed to select one out of four inputs. The selector comprises cores of rectangular hysteresis magnetic material in a co-ordinate array of rows and columns the cores being normally biassed to an arbitrary 0 condition by row bias current from batteries B1–4 through resistors R1–4 and a winding on each core in the row then via diodes D1–4 to the secondary winding of transformers. Bias current is removed one row at a time by the trains of SP pulses which are time-spaced. The input and output windings on each core are connected in columns, one winding in a column being connected to the input lead, and one to the output lead. Current entering an input lead tends to drive all the cores in the column to which it is connected to the arbitrary 1 condition. Any core so driven induces a voltage into its output winding and thus selects one of the inputs.

Again, bias current is arranged always to exceed input current. Thus, when an input occurs only the cores on the row from which current in the bias winding has been removed by the SP pulse can be driven to the 1 condition and only one of these can be so driven because of the effect of further bias windings on the cores which has been described above. The further bias windings on a given row of cores are arranged and connected so that a core in one first column is biassed by current in any other column, a core in a second column is biassed by current in any column other than the first and second column, a core in a third column is biassed by current in any column other than the first, second and third and so on. In the first row of FIG. 2 for example, it can be traced that core C14 is biassed to the 0 condition by current in inputs 3201, 3203, 3205, core C13 is biassed by current in inputs 3201, 3203, core C12 by current in input 3201, and C11 is not biassed by any input current. Hence input 3201 takes precedance over all others, input 3203 over all but 3201, 3205 overall but 3201 and 3203, and 3207 over none. The first row is therefore a one-only selector for which the order of selection for any combination of input leads is 3201, 3203, 3205, 3207, and indicated by an output on the coresponding lead 3202, 3204, 3206, 3208.

The order of selection is made different for each row. It can be traced from FIG. 2 that the order of selection of the second, third and fourth rows is 3203, 3205, 3207, 3201, 3205, 3207, 3201, 3203; and 3207, 3201, 3203, 3205 respectively. The rows are selected in order in a cycle which represents a row for each pulse of the pulses appearing on the input leads. Preferably, the number of channel pulses in the cycle is prime to the number of pulses whereby the association of rows of cores and pulses has an element of randomness. In the example of FIG. 2, the rows of cores are selected by the SP pulses applied to the transformers T. There are seven SP pulses distributed over the four rows. Clearly any number of rows can be used up to the number of SP pulses. Any number of columns can be used up to the practical limits of the number of windings, which can be put on any one core.

The operation of the one-only selector starts with al cores being in the arbitrary 0 condition induced by current in the row bias windings. During each input pulse the row bias current is removed from one row by an SP pulse operating on the transfromer T of the row. It a pulse occurs on one or more of the input leads, one core in the row will be changed to the 1 condition to induce an output pulse into one and only one output lead corresponding to one of the inputs. At the end of the pulse the one core will be restored to the 0 condition by the returning current in the bias winding.

I claim:

1. A selecting circuit comprising in combination a plurality of rows of rectangular hysteresis loop magnetic material cores, each row containing the same number of cores, and, for each core in each row, a biassing winding serving to maintain the core in a first magnetic condition, the biassing windings of each row of cores being connected to a bias source and a bias source disabling means common to the row only, an input winding for switching the core to its second magnetic condition and an output winding for producing an output when the core is switched to its second magnetic condition, a number of input leads equal to the number of cores in a row and an equal number of output leads, each input lead and each output lead being connected respectively to the input and output winding of a different core in one of the rows, the input winding of each core in that row being connected with the input winding of a different core in every other row, the output winding of each core of the first mentioned row being connected with the output winding of a different core in every other row, each core in each row being accorded a particular precedence in an order of precedence for selecting purposes, and, on each core except one in every row, disabling winding means which are energized to disable the core when an input is applied to the input winding of each core of higher precedence in the precedence order.

2. A selecting circuit as claimed in claim 1 in which the bias source disabling means comprises a source of a train of time spaced bias disabling pulses, the trains of the sources of the rows also being time spaced so that the rows are cyclically made available for selection purposes.

No references cited.

NEIL C. READ, *Primary Examiner.*

H. I. PITTS, *Assistant Examiner.*